US011878394B2

(12) United States Patent
Morehous

(10) Patent No.: US 11,878,394 B2
(45) Date of Patent: Jan. 23, 2024

(54) ANGLE VALVE WRENCH

(71) Applicant: No Crawlin' Wrench, LLC, Knoxville, TN (US)

(72) Inventor: Lynn Morehous, Knoxville, TN (US)

(73) Assignee: No Crawlin' Wrench, LLC, Knoxville, TN (US)

( * ) Notice: Subject to any disclaimer, the term of this patent is extended or adjusted under 35 U.S.C. 154(b) by 0 days.

(21) Appl. No.: 18/185,671

(22) Filed: Mar. 17, 2023

(65) Prior Publication Data

US 2023/0294254 A1 Sep. 21, 2023

Related U.S. Application Data

(60) Provisional application No. 63/321,525, filed on Mar. 18, 2022.

(51) Int. Cl.
*B25B 13/48* (2006.01)
*B25B 13/50* (2006.01)

(52) U.S. Cl.
CPC ........ *B25B 13/481* (2013.01); *B25B 13/5008* (2013.01)

(58) Field of Classification Search
CPC ... B25B 13/48; B25B 13/481; B25B 13/5008; B25B 13/065; B25B 13/08; B25G 1/102
See application file for complete search history.

(56) References Cited

U.S. PATENT DOCUMENTS

| | | | | |
|---|---|---|---|---|
| 5,862,721 A * | 1/1999 | Kowats | B25B 13/48 81/3.4 |
| 6,378,401 B1 * | 4/2002 | Lordahl | B25B 13/56 81/124.2 |
| 6,450,479 B1 * | 9/2002 | Reynolds | B25G 1/005 251/291 |
| 7,036,402 B1 * | 5/2006 | Marks | B25B 13/48 81/177.2 |
| D560,986 S | 2/2008 | Adkins et al. | |
| 7,347,129 B1 * | 3/2008 | Youtsey | H01R 43/26 81/472 |
| 10,688,632 B2 * | 6/2020 | Krasnik | B25B 13/5091 |

(Continued)

OTHER PUBLICATIONS

IRmm (8-in-1) faucet and sink installer, multi-purpose wrench plumbing tool, https://www.amazon.com/installer-multi-purpose-plumbing-Bathroom-Plumbing/dp/B07MSBY2S6, Accessed Mar. 7, 2023.

(Continued)

*Primary Examiner* — David B. Thomas
(74) *Attorney, Agent, or Firm* — Chambliss, Bahner & Stophel, P.C.; Stephen D. Adams

(57) ABSTRACT

An angle valve wrench configured for use in rotating an angle valve, the angle valve wrench having a body with a first end and a second end, defining a length L1. The body also has an outside surface and a central axis that is parallel to the length L1 and that passes through the first and second ends. A notch is formed at the first end that corresponds to an angle valve handle. A gripping element is formed on the outside surface of the wrench near the second end. A user places the notch of the wrench over a conventional angle valve from a standing position and rotates the wrench about the central axis, causing the angle valve handle to rotate.

20 Claims, 3 Drawing Sheets

(56) References Cited

U.S. PATENT DOCUMENTS

| | | | | |
|---|---|---|---|---|
| D892,592 | S | 8/2020 | Patil et al. | |
| 10,946,501 | B2 * | 3/2021 | Patil | B25B 23/0028 |
| 2004/0035258 | A1 * | 2/2004 | Spector | B25B 13/065 81/120 |
| 2008/0034927 | A1 * | 2/2008 | Adkins | B25B 13/48 81/124.2 |
| 2008/0041191 | A1 * | 2/2008 | McDermott | B25B 13/488 81/27 |
| 2008/0098858 | A1 * | 5/2008 | Thomas | B25B 13/02 81/124.2 |
| 2009/0013832 | A1 * | 1/2009 | Duffey | B25B 13/50 81/176.15 |
| 2018/0147715 | A1 * | 5/2018 | Promo | B25G 1/102 |
| 2022/0080558 | A1 * | 3/2022 | Zhang | B25B 13/5091 |

OTHER PUBLICATIONS

RIGID EZ Change Plumber Wrench Faucet Tool, https://www.ridgid.com/us/en/ez-change-faucet-tool, Accessed Mar. 7, 2023.

* cited by examiner

ANGLE VALVE WRENCH

CROSS-REFERENCE TO RELATED APPLICATIONS

This application claims the benefit of U.S. Provisional Application No. 63/321,525 filed Mar. 18, 2022, and entitled WRENCH, which is incorporated herein by reference in its entirety.

FIELD

The present invention relates generally to a plumbing wrench. In particular, the present invention relates to a wrench for operating an angle valve from a standing position.

BACKGROUND

In many residential and commercial buildings, plumbing fixtures (e.g., toilets, faucets, etc.) are supplied with water using a variety of valves, often including angle valves. An angle valve is typically closely located to the fixture and it allows a user to selectively supply water to the specific fixture. However, plumbing fixtures and their associated valves are often placed in locations that are difficult for a user to access, particularly if a user has limited mobility and cannot crawl. For example, the angle valve supplying water to a toilet is sometimes located underneath the toilet against an adjacent wall near the floor. Similarly, an angle valve supplying water to a faucet is often located underneath the faucet and against an adjacent wall. If the faucet is contained in a cabinet or is a part of a vanity, the associated angle valve is typically located within the cabinet housing the faucet.

With reference to the appended drawings, wherein like reference characters designate like or corresponding characters throughout the several views, FIG. 1 depicts a conventional angle valve 100 having a handle 102 that is typically oval-shaped and that includes a sidewall 104. As a user rotates the handle 104, an associated valve stem 106 also rotates and either opens or closes the valve, depending on the rotation direction. To fully open or fully close valve 100, the handle 102 typically must be rotated one full rotation (i.e., 360°). Because of the low frequency of use, the thermal cycling (i.e., changes in temperature over time) within the valve, and buildup from the mineral content of the water, the handle 102 often becomes stuck and difficult to rotate. In those cases, considerable torque may be required to rotate the valve 100.

Next, FIG. 2 depicts a second conventional angle valve 200 that includes a handle 202 having a vertical sidewall 204. The handle 202 is affixed to a valve stem 206. Unlike valve 100, valve 200 only requires a quarter-turn (90° rotation) of the handle 202 to move from a fully-opened position to a fully-closed position. While the small turning requirements make operating valve 200 faster and simpler than valve 100, the shape of the handle 202 is not very user-friendly and its rotation requires a level of hand strength that could make its operation difficult for some users. Further, valve 100 and valve 200 are generally used in the same inaccessible or difficult to access locations and, for that reason, are equally difficult to operate for many users. In addition, most users only operate such angle valves in emergencies (e.g., a situation where a water event has occurred and the supply of water must be stopped immediately). In such an emergency, time is often of the essence and a user, regardless of physical dexterity, generally needs to efficiently and quickly operate the angle valve.

What is needed, therefore, is a wrench to facilitate operation of valves, such as an angle valve, that allows a user to quickly rotate the valve from a variety of bodily positions, preferably including from a standing position, while also allowing the user to safely apply adequate torque to rotate said angle valve.

NOTES ON CONSTRUCTION

The use of the terms “a”, “an”, “the” and similar terms in the context of describing embodiments of the invention are to be construed to cover both the singular and the plural, unless otherwise indicated herein or clearly contradicted by context. The terms “comprising”, “having”, “including” and “containing” are to be construed as open-ended terms (i.e., meaning “including, but not limited to,”) unless otherwise noted. The terms “substantially”, “generally” and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as “attached”, “connected” and “interconnected”, refer to a relationship wherein structures are secured or attached to one another either directly or indirectly through intervening structures, as well as both moveable and rigid attachments or relationships, unless otherwise specified herein or clearly indicated as having a different relationship by context. The term “operatively connected” is such an attachment, coupling or connection that allows the pertinent structures to operate as intended by virtue of that relationship.

The use of any and all examples or exemplary language (e.g., “such as” and “preferably”) herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by an angle valve wrench configured for use in rotating an angle valve. The wrench may have a body having an outside surface, a first end and a second end defining a length L1, and a central axis parallel to length L and extending through a center of each of the first and second ends. A notch may be formed at the first end having a width W2 and a depth D1; and a gripping element may be formed at an offset distance L2 from the second end. The notch may be sized to engage an oval-shaped handle of a conventional angle valve. The length L1 may allow a user to rotate an angle valve handle from a standing position.

Also disclosed herein is an angle valve wrench configured for use in rotating an angle valve. The angle valve wrench may have a hollow, cylindrical body having an outside surface, an inside surface, a first end and a second end defining a length L1, and a central axis parallel to length L1 and extending through a center of each of the first and second ends. The length may be about 20". The first end may also include a notch having a width W1 of about $^{15}/_{16}$" at the outside surface and a depth D1 of about ½". The notch may also include a taper resulting in a width W2 at the inside surface greater than the width W1 at the outside surface. The second end may include a gripping element formed at an offset distance L2 from the second end. The notch may be sized to engage an oval-shaped handle of a conventional angle valve. The length L1 may be such that a user can rotate an angle valve handle from a standing position.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
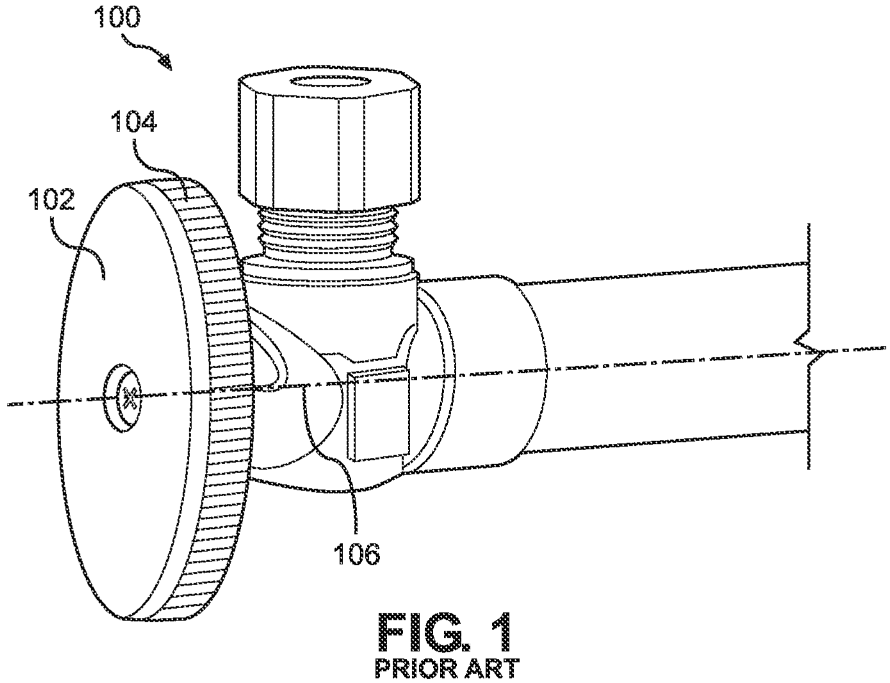
FIG. 1 PRIOR ART
FIG. 1 is a perspective view of a conventional full-turn angle valve.
Figure 2:
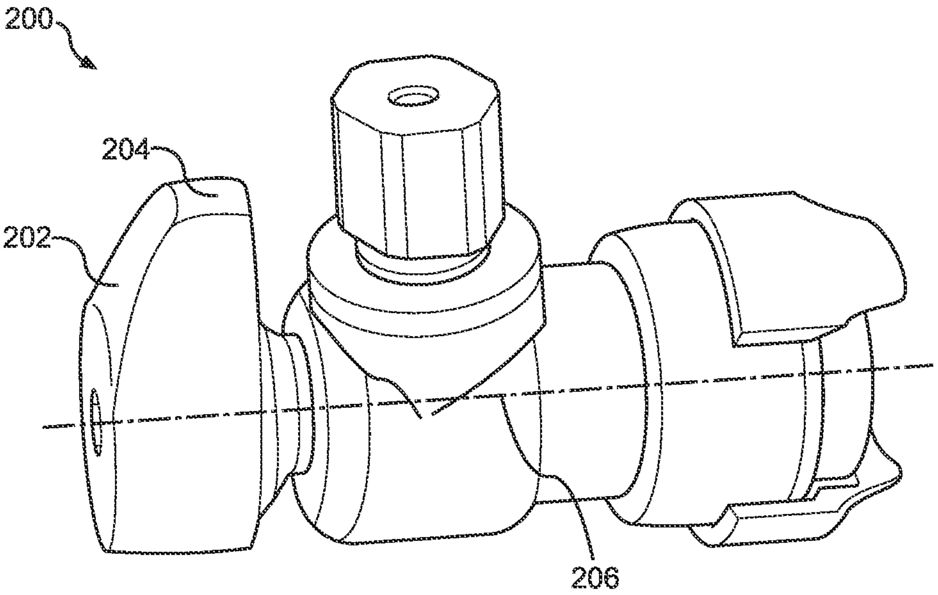
FIG. 2 PRIOR ART
FIG. 2 is a perspective view of a conventional quarter-turn angle valve.
Figure 3A:
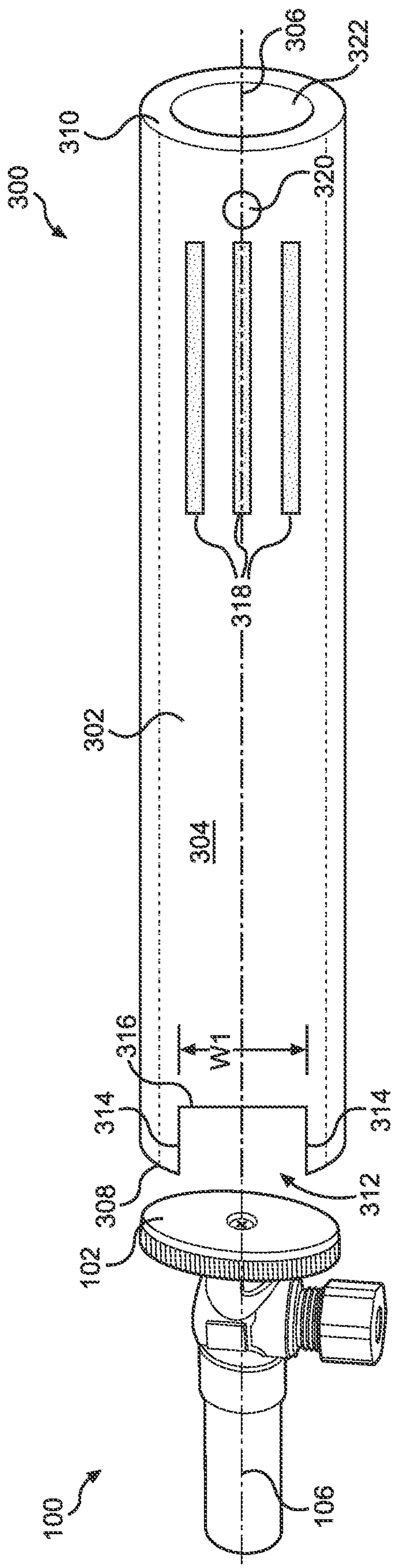
FIG. 3A is a perspective view of an angle valve wrench engaging a conventional angle valve at an angle θ of approximately 0° according to an embodiment of the present invention.

Now, with reference to FIGS. 3A-5, there is shown an angle valve wrench 300 for transmitting a rotational force sufficient to operate an angle valve (such as valve 100 of FIG. 1, as shown in FIG. 3, or valve 200 shown in FIG. 2), including from a standing position. Wrench 300 includes a body 302 having an outside surface 304, a length L1, and a central axis 306 that is parallel to length L1. Preferably, the length L1 is sufficient to allow a user to operate the wrench 300 from a standing or crouched position. In certain preferred embodiments, the length L1 is between 14" and 30". More preferably, the length L1 is 20". The body 302 is preferably substantially cylindrical in shape and has an outside diameter between 1½" and 2". More preferably, the outside diameter of the body 302 is 1⅝". However, in other cases, body 302 may be formed in other shapes and in other sizes. In certain further embodiments, the body 302 is hollow and includes an inside surface 322. Wrench 300 may be formed using any suitable material, including polyvinyl chloride (PVC) or other similar plastics, metal, or other sufficiently rigid materials (i.e., a material which does not deflect as a rotational force is applied about the central axis 306 when in contact with the angle valve 100).

Body 302 includes a first end 308 and a second end 310, and the central axis 306 extends through a center of each of the first and second ends. The second end 310 of wrench 300 preferably includes a gripping element 318 for assisting the user in gripping and applying a rotational force to the wrench 300. In certain embodiments, the gripping element 318 includes a plurality of protrusions, indentations, or other similar mechanisms or surface features to increase friction between a user's hand and the outside surface 304 of the wrench 300. For example, in one illustrated embodiment, gripping element 318 is formed as strips of commercially available adhesive-backed sand paper that are overlaid onto the second end 310 of the wrench 300. In other embodiments, the gripping element 318 comprises a plurality of elongate grooves, ridges (FIG. 5), or other surface features that are formed into or onto the outside surface 304 of the second end 310 of the wrench 300. These gripping elements 318 are preferably equally distributed and circumferentially spaced around the outside surface 304 of the wrench 300 and may be spaced at an offset from the second end 310 by a distance D2. The offset distance D2 provides a location for additional features, including those detailed below. In certain preferred embodiments, the offset distance D2 is between 1" and 2". In certain cases, the gripping elements 318 may vary in number from 4 to 8 total grooves and may be approximately ⅛" wide and approximately ⅛" deep. Preferably, the grooves 318 have a length L2 this is sized to approximate the width of a user's hand (e.g., approximately 2" to 3" wide).

In certain embodiments, the second end 310 may also include a torque-enhancer hole 320. Hole 320 may be located at any location along the body 302. However, preferably, the hole 320 is located within the offset distance D2 between the second end 310 and the gripping element 318. Hole 320 preferably passes perpendicularly through the entire body 302 and through central axis 306 in order to provide an insertion point for a rod 328 or other similar device to which a user may apply an increased turning (i.e., rotational) force onto the wrench 300. This increased turning force may sometimes be necessary or advantageous to rotating the wrench 300, such as when valve 100 is stuck. While a dedicated rod 328 may be provided, a screwdriver or other, similar implement will suffice to enhance the torque transmitted by the wrench 300. Preferably, the torque-enhancer hole 320 has a diameter between 3/16" and ½".

The first end 308 also includes a notch 312 that is formed by two opposing sidewalls 314 that are joined by wall 316. Preferably, sidewalls 314 are oriented vertically (as viewed in FIG. 3) and are parallel with one another. On the other hand, wall 316 is preferably horizontal (as viewed in FIG. 3). Further, wall 316 preferably extends continuously between and connects the sidewalls 314 together. The notch 312 is preferably sized and configured to engage a variety of valves, including valve 100 or valve 200, preferably, by the notch being placed over a valve such that the wall 316 contacts the handle 102 and at least one of the sidewalls 314 contact at least one of the sidewalls 104 of the handle. In the illustrated embodiment, the notch 312 has a width W1 that is the horizontal distance between the two vertical sidewalls 314. Width W1 is sized to allow the notch 312 to fit over the top of handles of a range of valves, including over handle 102 or over handle 202. In preferred embodiment, width W1 is sized such that the two sidewalls 314 contact the sidewall 104 of the valve 100 at a minimum of two locations as the wrench 300 is rotated about central axis 306.

Figure 3B:
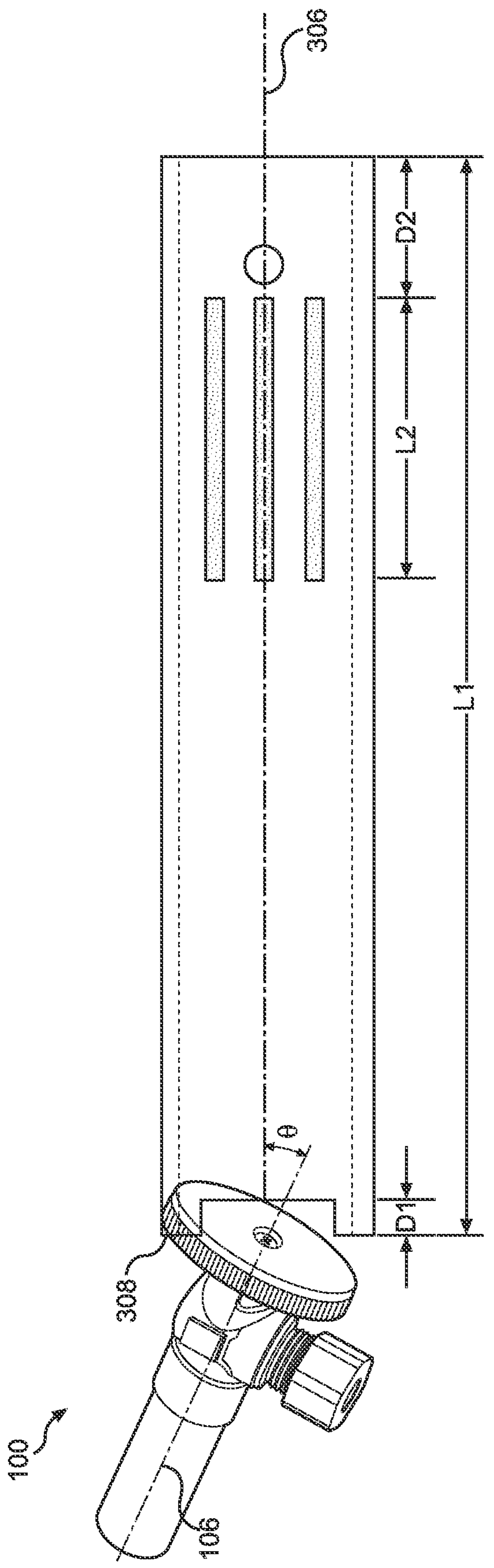
FIG. 3B is a front view of an angle valve wrench engaging a conventional angle valve at an angle θ of approximately 15° according to an embodiment of the present invention.
Figure 6:
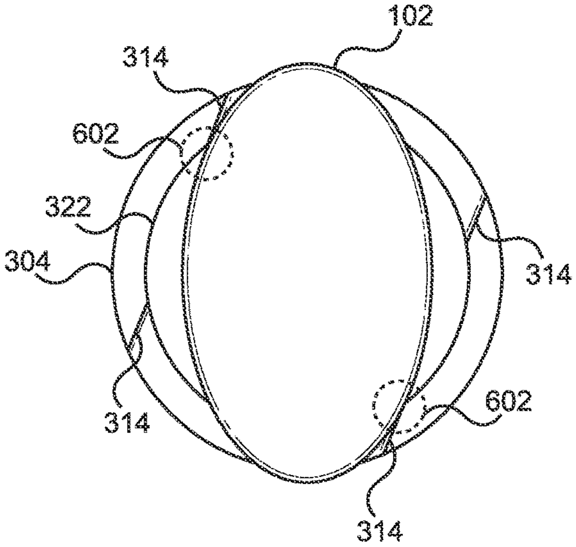
FIG. 6 depicts a first end of the angle valve wrench having a notch with straight sidewalls engaging a handle of a conventional full-turn angle valve according to an embodiment of the present invention.
Figure 7:
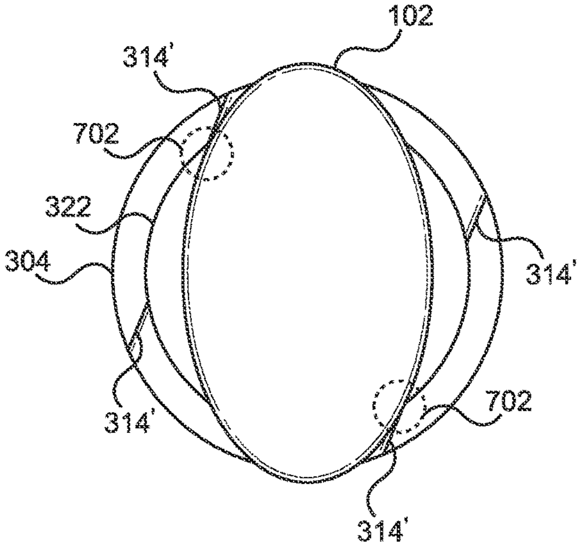
FIG. 7 depicts a first end of an angle valve wrench having a notch with tapered sidewalls engaging a handle of a conventional full-turn angle valve according to an alternative embodiment of the present invention.

With configured reference to reference to FIGS. 3A and 3B and with further reference to FIGS. 6 and 7, if width W1 is too large, notch 312 will not provide a secure connection with the valve 100. In particular, a notch 312 having a width W1 that is too large will be spaced too far from sidewalls 104 of the valve 100 and, for that reason, will allow for over-rotation of the wrench 300 before the sidewalls 314 contact the sidewalls 104 of the valve 100, which will provide too much "play" or "slop" in the use of the wrench during its use. Conversely, a width W1 that is too narrow will not allow the wrench 300 to correctly or adequately engage the handle 102 of the valve 100. Further, if width W1 is too narrow, the useable range of angle θ between the central axis 306 of wrench 300 and the stem 106 will be reduced. For example, if notch 312 is very narrow, it may be necessary to align central axis 306 with the stem 106 (i.e., angle θ equal 0°) in order for the wrench 300 to properly seat onto and to be capable of rotating the valve 100. Although this configuration might be acceptable in certain instances, it is often preferred or advantageous to operate the wrench 300 from a variety of angles and positions, including from a standing positon. As such, width W1 is preferably sized such that a user may engage a valve with wrench 300 at an angle θ, which preferably is between 0° and 30°, allowing the wrench to be used while the user is in various positions (e.g., standing, kneeling, etc.). In certain embodiments of the present invention, the width W1 of the notch 312 is between ½" and 1". More preferably, width W1 is approximately 15/16".

In FIG. 6, each of the vertical sidewalls 314 of the notch 312 are parallel and the width W1 of the notch 312 is fixed (i.e., the same) between the inside surface 322 and the outside surface 304. On the other hand, in the embodiment shown in FIG. 7, vertical sidewalls 314' are canted or tapered and are not parallel to each other. As such, a width W2 that is taken at the inside surface 322 is different (e.g., greater than or less than) than the width W1 that is taken (in this specific instance) at the outside surface 304. It may be appreciated that sidewalls 314 and 314' engage the handle 102 of the valve 100 differently. Specifically, sidewalls 314 contact handle 102 at roughly the intersection 602 between the inside surface 322 and the sidewalls. On the other hand, tapered vertical sidewalls 314' allow for greater contact between the sidewalls 314' of the wrench 300 and the sidewalls 104 of the valve 100 handle. Sidewalls 314' contact handle 102 at a tangent intersection 702 of the sidewalls and the handle. The increased contact area at intersection 702 provides for a more efficient transfer of rotational force from the wrench 300 to handle 102.

Returning to FIG. 3, the depth D1 of the notch (i.e., the distance between the first end 308 and the horizontal notch wall 316) should be sized to allow the wrench 300 to adequately engage the handle 102. Proper engagement between handle 102 and wrench 300 includes contact between wall 316 and handle 102. A depth D1 that is too shallow does not allow the notch 312 to adequately contact the handle 102. On the other hand, too great a depth D1 can result in interference between the valve 100 and the wrench 300 such that rotation of the angle valve is difficult or, in some cases, impossible. In each case, if depth D1 is too shallow or too deep, the useable range of angle θ may be reduced. In certain embodiments of the present invention, the depth D1 is between ¼" and 1". More preferably, the depth D1 is ½".

Figure 4:
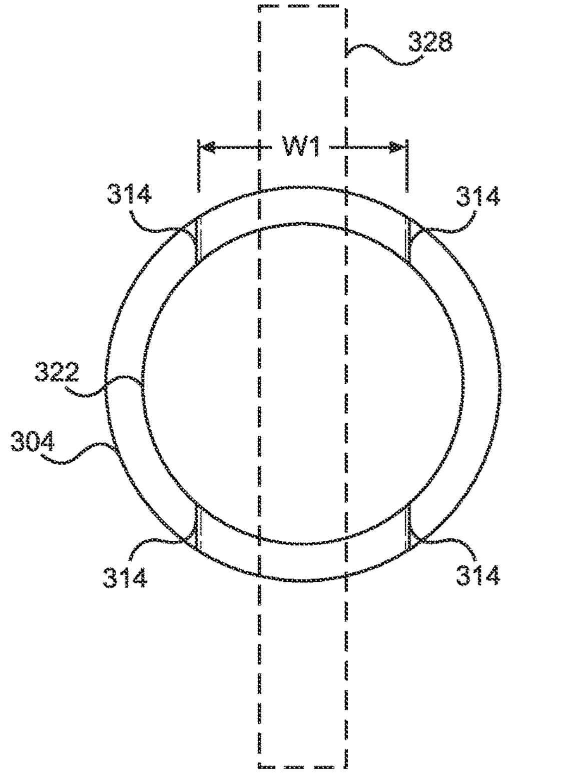
FIG. 4 depicts a first end of the angle valve wrench of FIG. 3.
Figure 5:
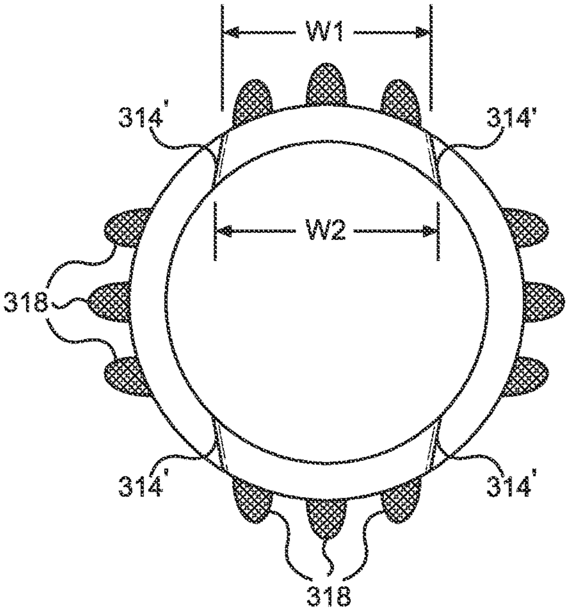
FIG. 5 depicts a first end of an angle valve wrench having external gripping elements in the form of adhesive-backed sand paper according to an alternative embodiment of the present invention.

Now, each of FIGS. 4 and 5, depict the wrench 300 as seen from the first end 308. In the embodiment shown in FIG. 4, each of the vertical sidewalls 314 of the notch 312 are parallel and the width W1 of the notch 312 is fixed (i.e., the same) between the inside surface 322 and the outside surface 304. On the other hand, in the embodiment shown in FIG. 5, vertical sidewalls 314' are canted or tapered and are not parallel. As such, in this second embodiment, the width W2 taken at the inside surface 322 is different (e.g., greater than or less than) than the width W1 of the notch taken at the outside surface 304.

As shown in FIGS. 6 and 7, sidewalls 314 and 314' engage the handle 102 of the valve 100 differently. Specifically, sidewalls 314 contact handle 102 at roughly the intersection 602 between the inside surface 322 and the sidewalls. Tapered vertical sidewalls 314' allow for greater contact between the sidewalls 314' of the wrench 300 and the sidewalls 104 of the valve 100 handle. Specifically, sidewalls 314' contact handle 102 at a tangent intersection 702 of the sidewalls and the handle. The increased contact area of intersection 702 provides for a more efficient transfer of rotational force from the wrench 300 to handle 102.

In using the wrench 300, a user first locates the valve 100 the user wishes to close to stop water flow or open to start water flow. Upon locating valve 100, the user will hold the wrench 300 by the second end 310 and, preferably at the gripping elements 318, which provide the user with a secure area to grasp the wrench. The user then orients the first end 308 of the wrench 300 towards the handle 102 of the valve 100. Preferably, while in a standing positon, the user then engages the handle 102 with the wrench 300 by placing the first end 308 over the handle such that the angle valve handle fits within the notch 312. Ideally, the user is provided with positive feedback that the wrench 300 is correctly "seated" on the valve 100 when the horizontal wall 316 contacts the valve. Once the wrench 300 is correctly and fully seated on the valve 100, the user then rotates the wrench about the central axis 306 in the desired rotational direction (i.e., clockwise or counter-clockwise). As the user rotates the wrench 300, the vertical sidewalls 314 or 314' contact the sidewall 104 of the valve 100 and translate a rotational force to the valve stem 106. If the handle 102 does not rotate or is difficult to rotate when a rotational force is applied to the wrench 300 (e.g., due to rust in or on the valve), the user may increase the applied torque by inserting rod 328, a screwdriver, or other similar device through the torque-enhancer hole 320 and then rotating the wrench using the device. This increased torque is generally sufficient to induce motion of the handle 102 in the desired direction. After rotating the handle 102 in the desired direction with the wrench 300, the wrench may be removed from the handle.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An angle valve wrench configured for use in rotating an angle valve handle, the angle valve wrench comprising:
- a unitary body having a first end and a second end defining a length L1, an outside surface having a continuous exterior wall, and a central axis extending through a center of each of the first and second ends;
- a notch formed at the first end having a width W1 and a depth D1; and a gripping element configured to increase friction between a user's hand and the body, the gripping element formed on the outside surface of the body and located at an offset distance D2 from the second end.

2. The angle valve wrench of claim 1 wherein the body is constructed from plastic.

3. The angle valve wrench of claim 1 wherein the notch is sized and configured to engage an oval-shaped handle of an angle valve.

4. The angle valve wrench of claim 1 wherein the width W1 of the notch is between ½" and 1" and the depth D1 of the notch is less than or equal to 1".

5. The angle valve wrench of claim 4 wherein the width W1 of the notch is about 15/16" and the depth D1 is about ½".

6. The angle valve wrench of claim 1 wherein the body is cylindrical in shape.

7. The angle valve wrench of claim 6 wherein the body is hollow and further comprises an inside surface.

8. The angle valve wrench of claim 7 wherein the notch is a tapered notch having a first width W1 at the outside surface and having a second and greater width W2 at the inside surface.

9. The angle valve wrench of claim 8 wherein the first width W1 of the tapered notch is between ½" and 1" and wherein the depth D1 is equal to or less than 1".

10. The angle valve wrench of claim 6 wherein the body has an outside diameter that is between 1½" and 2".

11. The angle valve wrench of claim 10 wherein the outside diameter is 1⅝".

12. The angle valve wrench of claim 1 wherein the length L1 is sufficient to allow a user to rotate the angle valve handle from a standing position.

13. The angle valve wrench of claim 12 wherein the length L1 of the body is between 14" and 30".

14. The angle valve wrench of claim 12 wherein the length L1 is 20".

15. The angle valve wrench of claim 1 wherein the gripping element comprises a plurality of groove-shaped depressions formed in the outside surface of the body and that are each oriented parallel to the central axis and that each have a length L2.

16. The angle valve wrench of claim 15 wherein the length L2 is between 2" and 3" and wherein the offset distance D2 is between 1" and 2".

17. The angle valve wrench of claim 16 further comprising a hole located on the body of the angle valve wrench within the offset distance D2 wherein the hole is oriented perpendicular to the length L1 and passes the central axis.

18. The angle valve wrench of claim 17 wherein the hole has a diameter between 3/16" and ½".

19. The angle valve wrench of claim 1 further comprising a hole disposed in and extending entirely through the body of the wrench, wherein the hole is oriented perpendicular to and passes through the central axis.

20. An angle valve wrench configured for use in rotating an angle valve, the angle valve wrench comprising:

a unitary, hollow, cylindrical body having a first end and a second end defining a length L1, the length L1 being about 20", a continuous outside surface, an inside surface, and a central axis parallel to the length L1 and extending through a center of each of the first and second ends;

the first end including a notch wherein the notch has a width W1 of about 15/16" at the outside surface, a depth D1 of about ½", and wherein the notch includes a taper resulting in a width W2 at the inside surface that is greater than the width at the outside surface; and the second end including a gripping element wherein the gripping element comprises a plurality of elongate grooves located on the outside surface at an offset distance D2 from the second end wherein a groove comprises a ⅛" wide and ⅛" deep groove-shaped depression oriented parallel to the length L1 of the body having a length L2.

* * * * *